United States Patent
Yousefbeiki et al.

(10) Patent No.: US 11,677,142 B2
(45) Date of Patent: Jun. 13, 2023

(54) GLAZING UNIT WITH A HOUSING

(71) Applicants: AGC GLASS EUROPE, Louvain-la-Neuve (BE); AGC Inc., Tokyo (JP); AGC FLAT GLASS NORTH AMERICA, INC., Alpharetta, GA (US); AGC VIDROS DO BRASIL LTDA, Sao Paulo (BR)

(72) Inventors: Mohsen Yousefbeiki, Gosselies (BE); Michael Bruscaglia, Gosselies (BE); Simon Castex, Gosselies (BE); Vincent Lieffrig, Gosselies (BE); Bernard Monville, Gosselies (BE); Adrien Lemoine, Gosselies (BE); Kevin Vergnolle, Gosselies (BE)

(73) Assignees: AGC GLASS EUROPE, Louvain-la-Neuve (BE); AGC Inc., Tokyo (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 0 days.

(21) Appl. No.: 17/782,580

(22) PCT Filed: Dec. 4, 2020

(86) PCT No.: PCT/EP2020/084653
§ 371 (c)(1),
(2) Date: Jun. 3, 2022

(87) PCT Pub. No.: WO2021/110926
PCT Pub. Date: Jun. 10, 2021

(65) Prior Publication Data
US 2023/0009179 A1    Jan. 12, 2023

(30) Foreign Application Priority Data
Dec. 5, 2019  (EP) ..................................... 19214002

(51) Int. Cl.
*H01Q 1/44* (2006.01)
*E06B 3/66* (2006.01)

(52) U.S. Cl.
CPC ............. *H01Q 1/44* (2013.01); *E06B 3/6612* (2013.01)

(58) Field of Classification Search
CPC ............................... H01Q 1/44; E06B 3/6612
See application file for complete search history.

(56) References Cited

U.S. PATENT DOCUMENTS

| 2005/0076588 A1 | 4/2005 | Sensini |
| 2009/0047900 A1 | 2/2009 | Cruz et al. |

(Continued)

FOREIGN PATENT DOCUMENTS

| EP | 1 986 266 A1 | 10/2008 |
| EP | 2 778 334 A1 | 9/2014 |

(Continued)

OTHER PUBLICATIONS

International Search Report dated Mar. 2, 2021, in PCT/EP2020/084653 filed Dec. 4, 2020, 3 pages.

(Continued)

*Primary Examiner* — Graham P Smith
(74) *Attorney, Agent, or Firm* — Oblon, McClelland, Maier & Neustadt, L.L.P.

(57) ABSTRACT

An improved glazing unit extending along a plane, P, defined by a longitudinal axis, X, and a vertical axis, Z; having a width, DW, measured along the longitudinal axis, X, and a length, DL, measured along the vertical axis, Z, including a glass panel, a housing able to accommodate a communication device and an opening arranged on the glass panel. The present invention also discloses a communication system including a glazing unit, at least a 4G and/or 5G signal communication unit and a provider fixed station or (Continued)

active or passive repeater, which is placed at least at 1 m outside from the glazing unit, wherein the 4G and/or 5G signal communication unit is fixed to the glazing unit at the opposite side from the provider fixed station or active or passive repeater.

17 Claims, 7 Drawing Sheets

(56) References Cited

U.S. PATENT DOCUMENTS

2016/0374150 A1 12/2016 Guillaume et al.
2019/0245256 A1 8/2019 Song et al.

FOREIGN PATENT DOCUMENTS

WO     WO 03/083242 A1   10/2003
WO     WO 2015/091016 A1   6/2015

OTHER PUBLICATIONS

International Preliminary Report dated May 17, 2022 in International application No. PCT/EP2020/084653, filed Dec. 4, 2020.

GLAZING UNIT WITH A HOUSING

TECHNICAL FIELD

The present invention relates to a glazing unit with a housing able to accommodate a communication device.

BACKGROUND ART

The demand of data traffic increases especially inside and outside buildings and vehicles, such as train, car, . . . In modern buildings, such as in modern vehicles, more and more glass is used and as thermal comfort is required, multiple glazing is commonly used.

Multiple glazing means a glazing unit with at least two glass panels combined together by a means of maintaining the two glass panels at a certain distance between the two glass panels. The glass panel placed outside of the building is called the outer glass panel where the other one is called the inner glass panel. To maintain the two glass panels at a certain distance one from the other, a spacer can be used in the periphery of the glazing unit with gas in the volume created between these two glass panels, pillars can be used between the two glass panels and a vacuum is created between these two glass panels, called vacuum insulated glazing (VIG). Usually, surfaces of glass panels have two main surfaces, one is oriented towards the outside of the building, vehicle, . . . while the other surface is oriented towards the inside of the building, vehicle, . . . These surfaces are named Sij where i and j are positive integers where i represents a reference to the glass panel itself and j represents the surface of this glass panel. The surface Sij with j number equals to one (S11, S21, . . . ) corresponds to the surface facing the outside of the building, vehicle, . . . The surface Sij with j number equals to two (S12, S22, . . . ) corresponds to the surface facing the inside of the building, vehicle, . . . In a multiple glazing comprising a first glass panel with S11 and S12 surfaces and a second glazing panel with surfaces S21 and S22, S12 and S21 are facing to each other to create a volume between these two glass panels.

In other words, surfaces of a glazing unit can be summarized as from outside of the building: S11/S12/volume/S21/S22 then the inside of the building.

In order to reduce the accumulation of heat in the interior of a building or vehicle, a glazing unit may be coated with a coating system, for example a solar control coating system, which absorbs or reflects solar energy. Inclusion of solar control films, particularly on glazing for use in warm, sunny climates, is desirable because they reduce the need for air conditioning or other temperature regulation methods. This affords savings in terms of energy consumption and environmental impact.

Such coating systems, however, are typically electrically conductive and are highly reflective for Radio Frequency (RF) waves and low in transmittance for RF waves. This effect impedes reception or transmission by antennas (or wireless devices).

To ensure the thermal comfort inside the building, a coating system such as a solar control coating can be provided on at least one of the inner surfaces of the glazing panel This makes the coating systems efficient and broadband reflectors of radio frequency signals. Furthermore, commercial construction, automotive, train, . . . tend to use other materials that further block RF signals. Materials such as concrete, brick, mortar, steel, aluminum, roofing tar, gypsum wall board, and some types of wood all offer varying degrees of RF attenuation. The result is that many newer constructions severely impede RF signals from getting into or out of the buildings.

In some embodiments, where a glazing unit according to the invention has several coating systems between the housing and the outside of the building, vehicle, . . . , every coating system has to have a decoated zone at least in front of the housing.

Nonetheless, RF devices have become an important part of modern life, especially with the huge penetration of cellular smartphones, tablets, IoT (Internet of Things) devices, that are requiring a deep penetration in buildings or automotive of electromagnetic field for indoor coverage, even at high spectrum frequency up to 70 GHz. Such devices may include cellular transceivers, wireless local area network ("Wi-Fi") transceivers, Global Positioning System (GPS) receivers, Bluetooth transceivers and, in some cases, other RF receivers (e.g., FM/AM radio, UHF, etc.). As the popularity of such devices has grown, the importance of being able to use RF-based features within the confines of modern commercial buildings has grown.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to have a wide band frequency selective surface in order to ensure the transmission of waves with different frequencies through the glazing unit.

The ITU IMT-2020 specification demands speeds up to 20 Gbps, achievable with wide channel bandwidths and massive MIMO 3rd Generation Partnership Project (3GPP) is going to submit 5G NR (New Radio) as its 5G communication standard proposal. 5G NR can include lower frequencies, below 6 GHz, and mm-Wave, above 15 GHz. On top of that, IoT will requires indoor coverage as good as possible not for massive MTC (Machine Type Communication) but for critical MTC where robots or industrial devices are 5G wireless remotely controlled.

Coating systems strongly attenuates EM signals when passing through glazing panels. And especially at mm-Wave, the signal level rapidly decreases due to high path loss. Many residential/commercial buildings therefore need outdoor, or outdoor-indoor repeaters and indoor CPEs. On top of that, an outdoor unit is typically undesirable for security reasons but also to provide easily power or to avoid environmental conditions that can damage the outdoor unit.

In case of the CPE and/or the repeater is placed inside the building, the signal is attenuated by at least 30 dB through glazing unit with a coated glass panel.

Some solutions provide a decoated portion on the coated glass panel. This decoated portion improves the signal inside the building but creates a narrow field of view. Especially at mm-Wave frequencies, beamforming is important to improve the signal to interference ratio (SIR) also because obstacles cause greater diffusion of the signal and less specular reflection meaning that there is higher propagation losses in NLOS. These solutions, to provide a greater field of view, need a greater decoated portion meaning loosing thermal performances of the glazing unit.

An object of one embodiment of the present invention is to provide a glazing unit capable of increasing the field of view from the indoor unit, capable to have a wide field of view and keeping higher chance to provide LOS link compared to existing solutions when beamforming for the transmission of waves with lower frequencies, below 6 GHz, and mm-Wave, above 15 GHz through a glazing unit.

SUMMARY OF INVENTION

It is an object of the present invention to alleviate these problems and especially the outdoor to indoor and/or the indoor to outdoor penetration, and to provide a glazing unit capable of increasing the field of view from the indoor unit, capable to have a wide field of view and keeping higher chance to provide LOS link compared to existing solutions for the transmission of waves with lower frequencies, below 6 GHz, and mm-Wave frequency, above 15 GHz through the glazing unit and shall be intended as an improvement. The present invention also provides a solution to improve the scanning range of beamforming, meaning a wider field of view, and a longer range of use.

According to a first aspect of the invention, the invention relates to an improved glazing unit extending along a plane, P, defined by a longitudinal axis, X, and a vertical axis, Z; having a width, DW, measured along the longitudinal axis, X, and a length, DL, measured along the vertical axis, Z, comprising a glass panel, a housing able to accommodate a communication device and an opening arranged on the said glass panel.

The solution as defined in the first aspect of the present invention is based on the opening has substantially same dimensions in plane P as the said housing and in that the housing is placed in the said opening.

According to the invention, the glazing unit may comprise a 4G and/or 5G signal communication device having at least one antenna. In some embodiments according to the invention, the communication device is a mm-Wave signal communication device.

According to the invention, the housing comprises side parts and a cover and in some embodiments, the housing can comprise a bottom surrounded by side parts. The bottom can be a plain or with at least one hole in order to optimize the communication. This bottom can have a flat or free center part to avoid signal issues. Borders of the bottom can be curved to fulfill with other parts of the housing. The cover and/or sides of the housing can have parts interacting with respectively sides or the cover.

According to the invention, the housing can have at least one attaching means for attaching the cover to the side parts the matching element is fixed to the housing by at least one adaptable means able to adapt the distance, between 0.5 mm and 30 mm, between the matching element and the antenna.

The communication device can be fixed by any means able to fix this communication device such as clips, screws, . . . Alternatively, at least one adaptive fixing means can be used to fix the communication device to the housing to adapt the distance between the antenna and the housing to minimize the detuning of the antenna.

According to the invention, the housing can be made in a single piece meaning that sides, cover and the bottom if exists are a single piece. In some others embodiments, the housing can be made in separate pieces, all pieces can be assembled together by fixed or detachable means, such as glue, encapsulation, soldering, welding, screw, hooks, . . .

According to the invention, the housing can have at least one attaching means for attaching the cover to the side parts, preferably detachable attaching means to open the housing for maintenance.

According to the invention, a coating system which is low in transmittance for RF signal can be disposed on at least one major surface of the glazing panel.

According to the invention, the opening can be arranged in the area of a corner of the said glass panel and preferably in the lower part of the said glass panel. In some embodiments, the opening can be a cut-out and the shape of the cut-out is triangular or an arc or a polygon.

According to the invention, the opening is arranged in a side of the said glass panel and preferably in the lower part of the said glass panel. In some embodiments, the opening is a cut-out and the shape of the cut-out is a rectangular or an arc or a polygon and preferably one side of the side rectangular has substantially the same size as the side of the said glass panel.

According to the invention, the opening is surrounded by the said glass panel.

The matching element can also be embedded in the housing.

According to the invention, the housing can comprise a heatsink, and in some embodiments, the said heatsink is placed on the cover facing the outside of the said housing.

According to the invention, the communication device may comprise at least one RF module and the said heatsink is thermally connected to at least the said at least one RF module. Thermally means that the heat generated by at least the RF module can flow to the heatsink to be dissipated.

The present invention relates also to a communication system comprising at least a glazing unit as described and a provider fixed station or active or passive repeater, which is placed at least at 1 m outside from the glazing unit.

The present invention relates also to a communication system comprising at least a glazing unit as described to provide indoor and/or outdoor coverage as a fixed access point.

According to the invention, the glazing unit may comprises at least one glass panel, a first glass panel having two majors surfaces S11, S12, and in some preferred embodiments, the glazing unit can comprises more than a first glass panel and comprises a second glass panel having two majors surfaces S21, S22. The said second glass panel combined to the first glass panel by at least a means of maintaining the two glass panels at a certain distance between the surface S12 of the first glass panel and the surface S21 of the second glass panel. The said second glass panel can also be laminated with the first glass panel.

At higher frequencies the two glass panels can be low or high in transmittance for RF waves depending on the polarization of the signal, the angle of incidence and the frequency. High in transmittance for RF radiation means that RF radiation are mostly transmitted through the material where low in transmittance for RF radiation means that RF radiation are mostly reflected on the surface of the material and/or absorbed by the material and the attenuation is at level of 20 decibels (dB) or more. High in transmittance means an attenuation at level of 10 decibels (dB) or less. The coating system which is low in transmittance for RF radiation means that the coating system is blocking RF radiation to pass through the glazing.

In some embodiments according to the invention, a coating system which is low in transmittance for RF radiation can be disposed on one surface of the glazing unit. The said at least one coating system can have at least one decoated zone. In case of at least one glass panel has more than one glass sheet, several coating systems can be disposed on different surfaces of the glazing unit.

The decoated zone means a zone of the coating system where the coating system is removed or has been masked during his application. In the decoated zone, the coating system is totally or partially absent or a plurality of small slits or any shape in the coating system to become a frequency selective surface in order to let waves pass from one side to the other side of the glass panel to further suppress deterioration of radio wave transmission performances. The decoated zone can be limited to a zone in front of the said housing meaning that the decoated zone is placed vis-à-vis of the zone where the housing is fixed on.

As the glazing unit is placed in a building or in a vehicle, the glazing unit is placed vertically or with an angle from the vertical axis (Z-axis) in a way that the glazing unit has an upper part and a lower part. The upper part is the part with higher z-values and the lower part is the part of the glazing unit with lower z-values.

It is noted that the invention relates to all possible combinations of features recited in the claims or in the described embodiments.

The following description relates to a building window unit but it's understood that the invention may be applicable to others fields like automotive or transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

For a better understanding, the scale of each member in the drawing may be different from the actual scale. In the present specification, a three-dimensional orthogonal coordinate system in three axial directions (X axis direction, Y axis direction, Z axis direction) is used, the width direction of the glazing unit is defined as the X direction, the thickness direction is defined as the Y direction, and the length is defined as the Z direction. The direction from the bottom to the top of the glazing unit is defined as the +Z axis direction, and the opposite direction is defined as the −Z axis direction. In the following description, the +Z axis direction is referred to as upward and the −Z axial direction may be referred to as down following arrows.

With reference to FIGS. 1 to 5, an embodiment of the present invention is described.

As shown in FIGS. 1 to 5, the invention relates to an improved glazing unit 1 extending along a plane, P, defined by a longitudinal axis, X, and a vertical axis, Z; having a width, DW, measured along the longitudinal axis, X, and a length, DL, measured along the vertical axis, Z, comprising a glass panel 10, a housing 20 able to accommodate a communication device 24 and an opening 15 arranged on the said glass panel 1.

The opening has substantially same dimensions in plane P as the said housing and in that the housing is placed in the said opening.

The housing is placed in one lower corner of the glazing unit meaning that X-values and Z-values are the lowest and dimensions of the borders in P plane are Dh1, Dh2, Dh3.

The glazing unit also comprises an opening 15 which is arranged on the glazing panel 10 to allow the housing 20 to be inserted on. It means that the housing is facing the outside of a building and the cover of the housing is facing to the inside of the building. In this embodiment, the opening is a cut-out and the shape of the cut-out is triangular. Dimensions of the opening in P plane are slightly similar to those of the housing to allow the housing to the be placed in the said opening while to avoid the space between the housing and the opening and therefore to minimize the movement.

Figure 1:
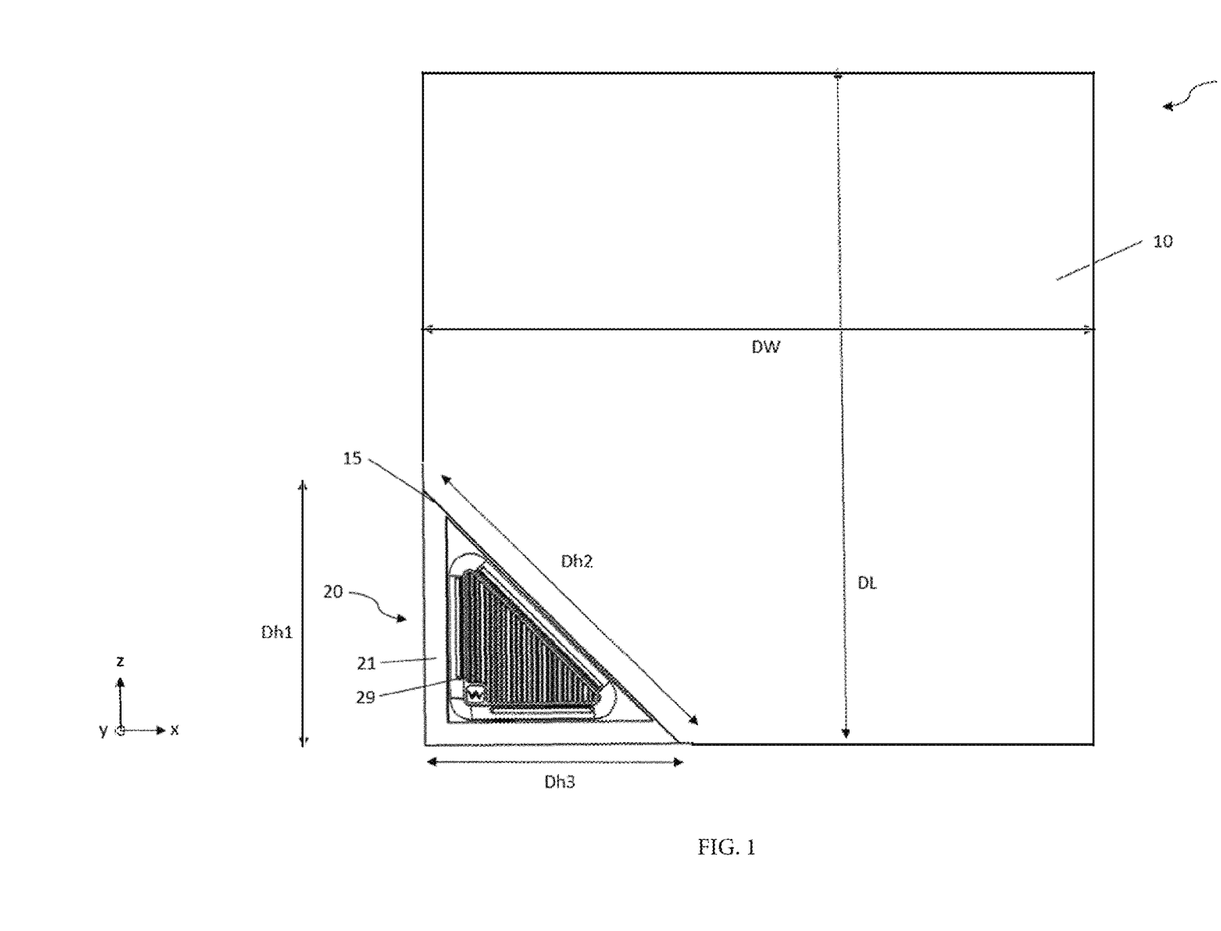
FIGS. 1 and 2 are schematic views of a first embodiment of glazing unit according to the invention.
Figure 2:
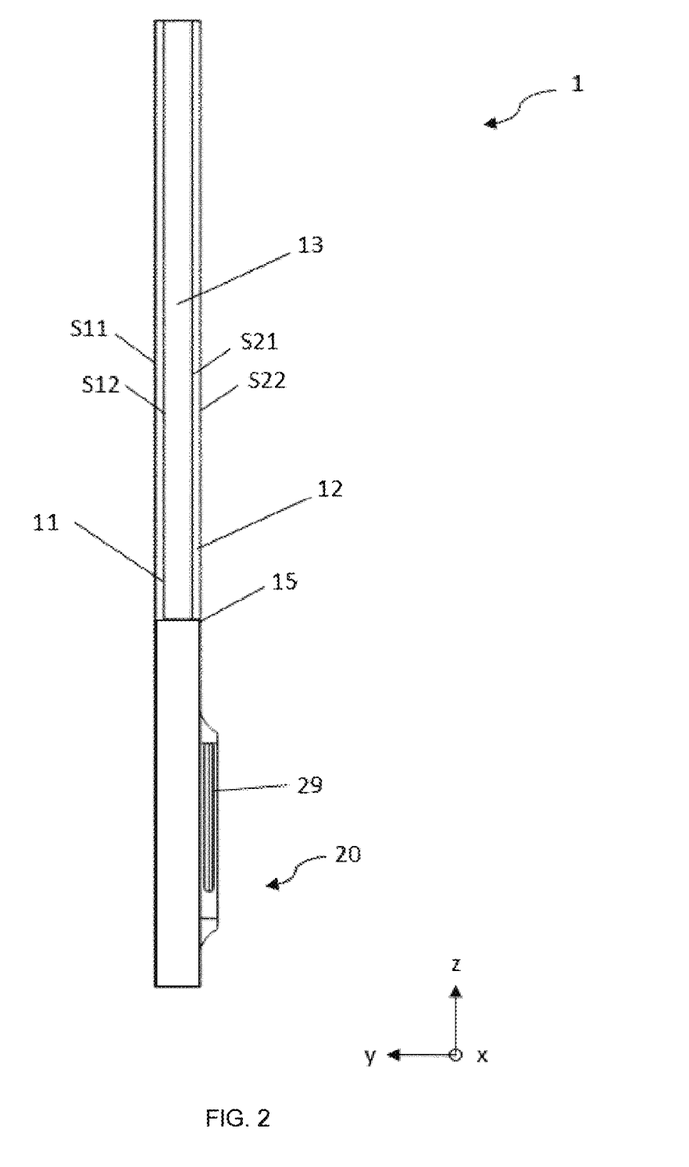
Figure 3:
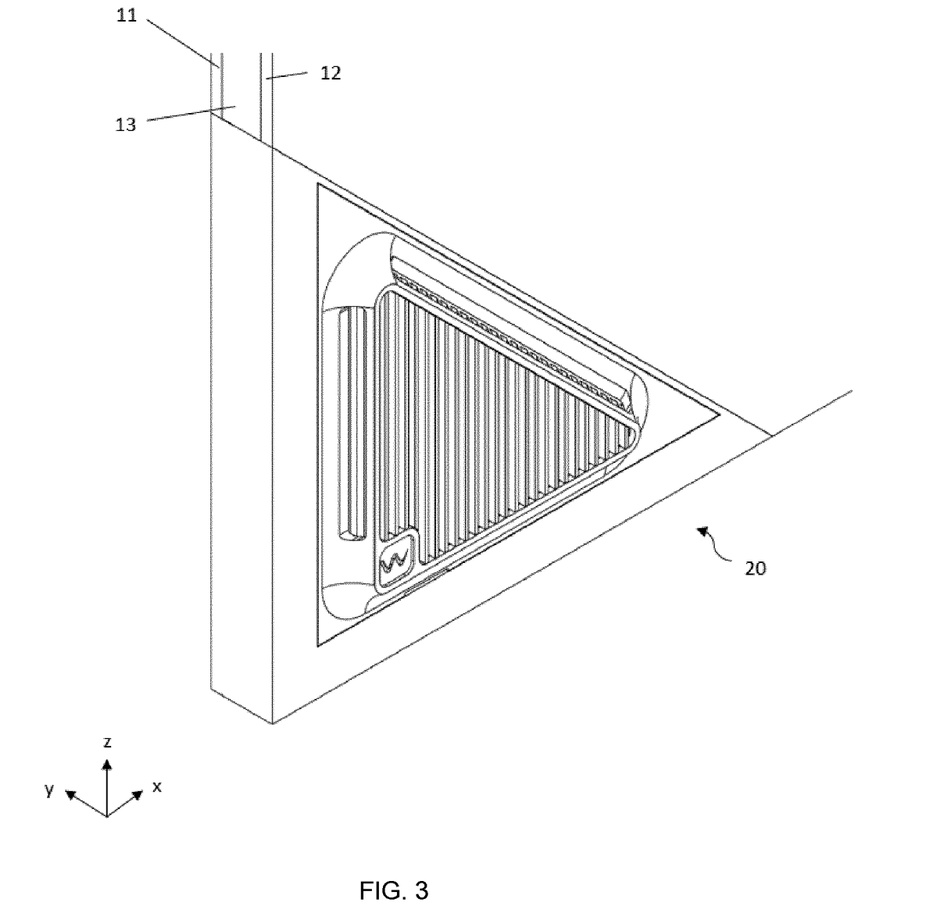
FIGS. 3 to 5 are schematic sectional views of a first embodiment of glazing unit according to the invention.
Figure 4:
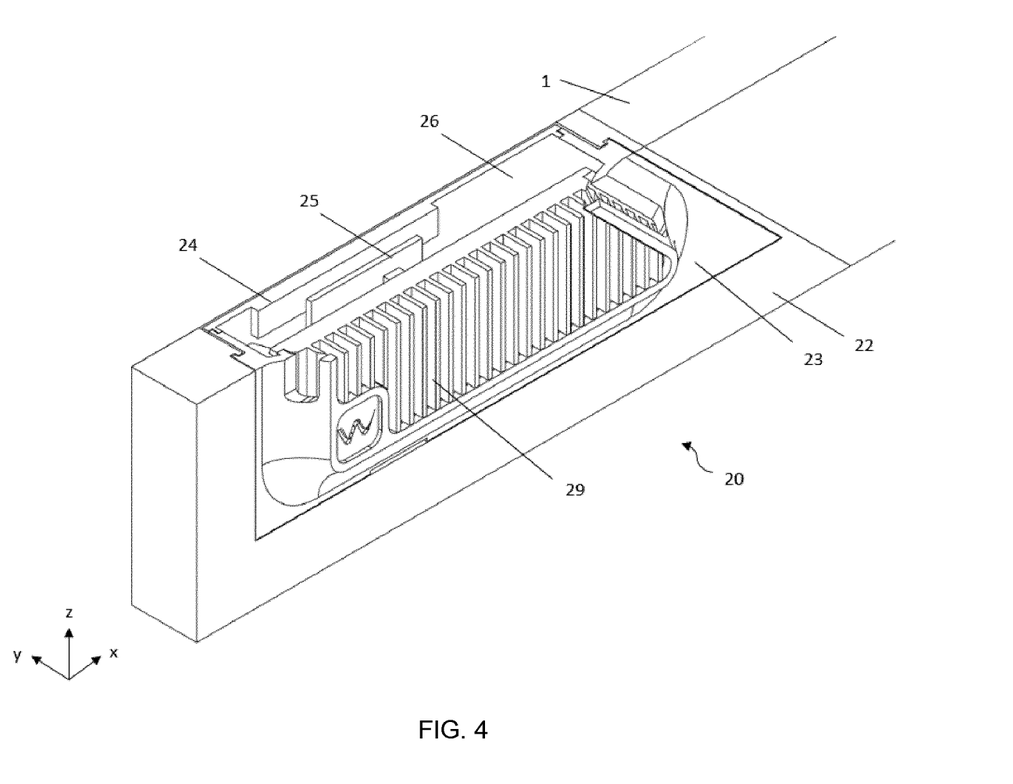

In some embodiment, regarding FIG. 1 the opening may have another shape than a triangle, for example a part of circle (an arc), a square, a polygon, a rectangle, . . .

In some embodiments, the glazing panel can comprises more than one glass panel. These glass panels can be laminated together by at least one interlayer to reduce the noise and/or to ensure the penetration safety. The laminated glazing comprises glass panels maintained by one or more interlayers positioned between glass panels. It means that between the housing and the outside of the building, vehicle, . . . it is possible to have more than one glass sheets. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

Figure 7:
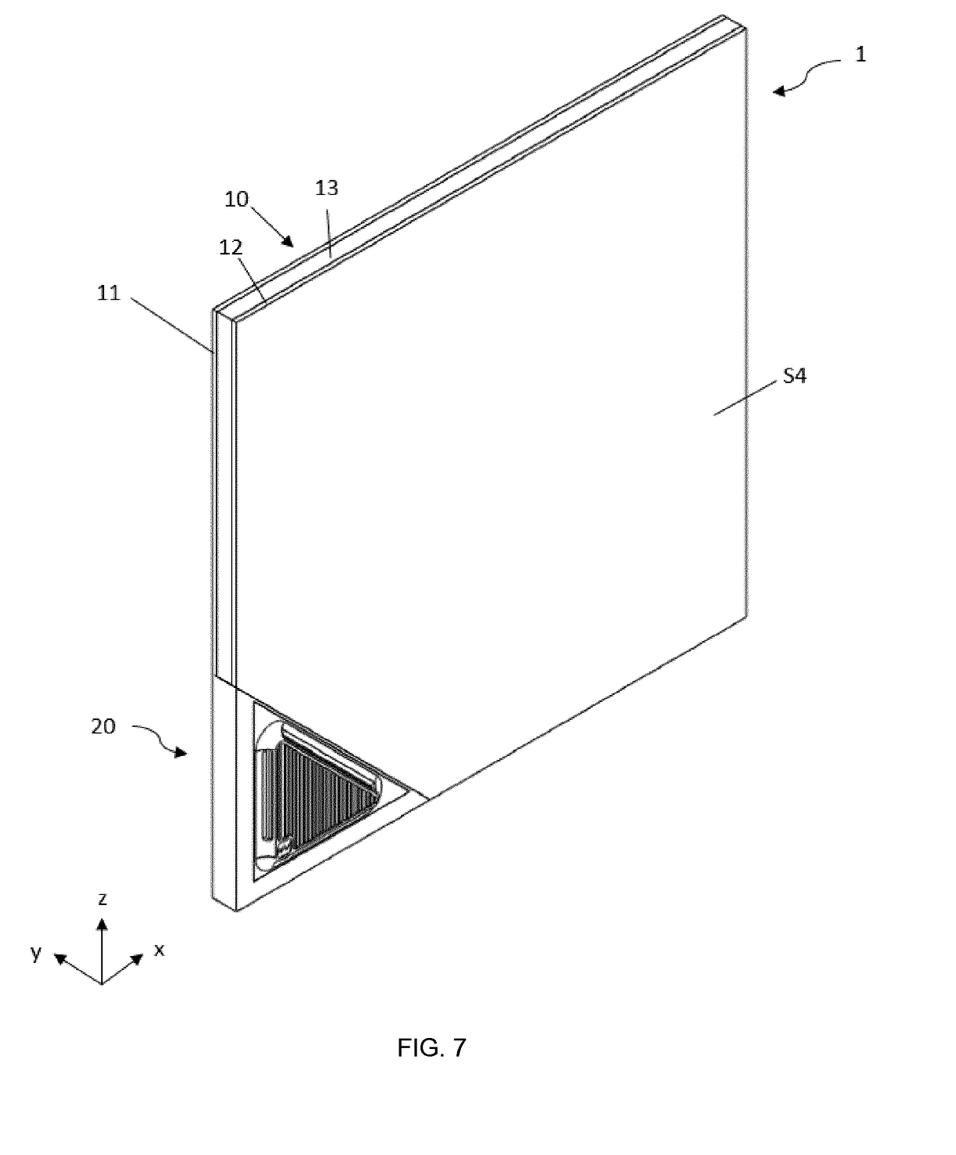
FIG. 7 is schematic views of embodiments of glazing unit according to the invention.

In some embodiments, the glazing panel can comprises more than one glass panel. These glass panels can be combined together by at least a means of maintaining the two glass panels at a certain distance. It means that between the housing and the outside of the building, vehicle, . . . It is possible to have more than one glass sheets, as shown in FIG. 7.

The housing can be fixed by a double-sided tape, a glue or any suitable fixing means able to fix the housing to the glazing panel.

Usually, the glazing unit 1 is inserted into a frame, being placed in a space provided for this purpose in a building. The frame has a U-form shape allowing to insert the glazing unit in the U-form. A part of the housing is then inserted in the U-form of the frame (not shown). The frame has a weather strip (not shown) around it to ensure the tightness between the frame and the glazing unit. This weather strip presses the first outer glass pane on one side and the second outer glass pane and the housing on the other side. The housing can also be placed in the opening and secured by the frame. In this case, the frame is over a least a part of housing as the frame is over a part of the glass panels.

The housing comprises a matching element 24.

The housing can be made of different parts 22, 23, 26. These parts allows to fix the housing to the glazing unit and to intervene on the electronic elements such as the communication device 25.

The housing may have fixed part 22 able to be fixed on an interior surface of a glazing unit and a movable part, 23 such as a cover to protect the inside of the housing when the housing is not used or to protect the electronics devices once there are in. The movable part can be assembled to the fixed part by any suitable means such as screw, clip, barbhook, male/female elements or any other means able to keep the movable part assembled to the fixed part.

According to some embodiment of the invention, the communication device comprises at least an RF front-end module for 4G and/or 5G systems. This module in turn can incorporate an antenna element or an array of antenna elements, and RF modules such as TX power amplifiers, RX low noise amplifiers, up and down convertors, and Phase-locked loop (PLL). The antenna element(s) can be single-polarized or dual-polarized depending on the application. When beamforming is required to improve the signal to noise and interference ratio, a passive or active phased-array antenna can be used, for example in mm-Wave.

Alternatively, to avoid degradation of beamforming performances, the communication device is placed at least at one quarter wavelength ($\lambda/4$) of the operation frequency from the edge of the glazing unit.

The module can be used for an integrated or detached indoor repeater (either in the same or different technology), fixed wireless CPE, TV decoder, and/or DAS system to enhance the link performance among indoor user's terminals and the provider's fixed stations such as base stations, small cells, and active repeaters. These provider's fixed stations are at least at 1 m far from the glazing unit, typically from 50 m to 200 m far from the glazing unit.

By indoor, interior, it is understood that it is inside the building, the vehicle, ... where the glazing unit is installed while outdoor means outside the said building, the vehicle, ...

The said communication device is fixed to the housing by at least one fixing mean 26. Alternatively, depending on the application, the said at least one fixing means can be removable fixing means such a screw, ... The at least one fixing means can also have a distance regulation system to place the communication device in a defined distance from S12 such Archimedes' screw.

Alternatively, the communication device is low power to control the heat dissipation around the glazing unit.

In some embodiments according to the invention, the housing may comprise a heatsink to dissipate the generated heat from the electronic elements. This heatsink is thermally connected by at least one element 27 to the communication device. The heat sink size and type is chosen to limit the temperature increase on the surface S12 of the glazing unit in front of the communication device and also depending on the electronic used in the communication device.

The housing can be made of plastic such as polycarbonate, ABS, PU, PMMA, or any other plastic material able to use as a housing. The housing can be made of metallic material such as aluminum. Alternatively, material used for the housing is UV resistance and low expansion material.

The sides, the cover and the bottom of the housing can be made in the same material or different material. Sides and/or cover and/or bottom, if exists, can be made in a single piece or different pieces.

According to the invention, a treatment such as a paint, a local etching, ... can be applied at least in front of the housing to avoid UV issues or to hide the housing from outside.

In some embodiments according to the invention, where the first glass panel is low in transmittance for the operation frequency range and/or for a given polarization and an angle of incidence, a matching element 25 can be added between the bottom of the housing and the communication device to maximize the transmission of the signal through the glazing unit.

When the communication device incorporates a phased-array antenna to be able to perform beamforming, a first glass panel with high reflectance within the operation frequency range and/or for a given polarization and an angle of incidence increases the mutual coupling among the antenna elements, and deteriorates the RF components performance.

Surprisingly, the matching element decreases the mutual coupling and thus allows the electronics to work properly.

According to the invention, the matching element is composed of at least a dielectric, preferably with a permittivity between 2 and 11, and with a low loss factor, preferably below 0.01. It can comprise two or more dielectrics and some periodic and/or pseudo-periodic metallic patterns (with some resonance between 0.5 to 2 times of the operation frequency).

The matching element has alternatively a thickness between 0.2 mm to 8 mm, and is placed at a distance of between 0 mm to 15 mm from the surface where the housing can be fixed on.

According to the invention, a matching layer 24, is embedded or is a part of the housing, especially part of the flat part of the bottom 26, of the housing, to minimize the cost and the handling. This matching layer 24, is in front of at least a part of the communication device 25 especially at least in front of the antenna aperture.

In some embodiments according to the invention, the matching layer can be fixed to sides 22 or to the cover 23 of the housing. The matching layer 24 can be fixed to the communication device 25.

Alternatively, there is at least a distance equivalent to one tenth of the operation wavelength ($\lambda/10$) between the antenna and the matching element to avoid antenna detuning.

In some embodiments, this matching element can be incorporated, embedded to the bottom or at least one side of the said housing. In some other embodiments, the matching element can be fixed to the communication device or can be fixed to the surface where the housing can be fixed on.

Alternatively, the matching element is at least substantially the same size as the antenna aperture (not shown) of the communication device to maximize the signal transmission.

Alternatively, depending on the application, the said matching layer can be removable fixed with means such a screw, ... The at least one fixing means can also have a distance regulation system to place the matching layer in a defined distance from the bottom of the housing such Archimedes' screw.

According to the invention, the opening 15 is not in a corner but in a side of the second inner glass pane 111. Preferably in these embodiments, the opening has a rectangular shape and preferably one side of the side rectangular has substantially the same size that the side of the second inner glass sheet meaning that the second inner glass pane a cut portion along a side (in the X-axis and/or Z-axis) where the housing having slightly the same dimension than the cut portion to have substantially the same dimensions than the first outer glass pane. Dimensions of the housing in X- and Z-axis slightly correspond to the difference between dimensions of first outer glass pane 11 and second inner glass pane 12. It means that DhW slightly equals to DW.

In this embodiment, the housing can be fixed to glass panel 11 thought the said opening 15. Usually, the glazing unit 1 is inserted into a frame, being placed in a space provided for this purpose in a building. The frame has a U-form shape allowing to insert the glazing unit in the U-form. A part of the housing is then inserted in the U-form of the frame (not shown). The frame has a weather strip (not shown) around it to ensure the tightness between the frame and the glazing unit. This weather strip presses the first outer glass pane on one side and the second outer glass pane and the housing on the other side. The housing can also be placed in the opening and secured by the frame. In this case, the frame is over a least a part of housing as the frame is over a part of the glass panels.

The glazing unit can be placed on a façade of a building as a window. The glazing unit according to the invention can also be placed as a window of a vehicle.

In some embodiments, at least one of the two glass panels comprises two glass sheets laminated together by at least one interlayer to reduce the noise and/or to ensure the penetration safety. The laminated glazing comprises glass panels maintained by one or more interlayers positioned between glass panels. It means that between the housing and the outside of the building, vehicle, . . . it is possible to have more than one glass sheets. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

In some embodiments, at least one of the two glass panels comprises two glass sheets combined together by at least a means of maintaining the two glass panels at a certain distance. It means that between the housing and the outside of the building, vehicle, . . . It is possible to have more than one glass sheets.

The housing can be fixed by a double-sided tape, a glue or any suitable fixing means able to fix the housing on the surface facing the interior of the building S22. In some embodiments, the glazing panel comprises only a first glass panel, the housing is fixed on the surface S12.

The communication device can be connected to a cable 50 such as Ethernet cable and/or a power cable.

According to the invention, the shown glazing unit 1 extending along a plane, P, defined by a longitudinal axis, X, and a vertical axis, Z; having a width, DW, measured along the longitudinal axis, X, and a length, DL, measured along the vertical axis, Z, comprising at least a first glass panel 11 and a second glass panel 12 combined together by a means 13 of maintaining the two glass panels at a certain distance between the two glass panels.

In this embodiment, the means is a spacer 13 and the spacer separates the first glass panel from the second glass panel to create a space filled by a gas like Argon to improve the thermal isolation of the glazing unit, creating an insulating glazing unit. The spacer is then placed in the border of the second glass panel allowing the tightness of the volume 14 of the glazing unit to keep the gas in this volume 14.

Alternatively, the materials used to fix the spacer to glass panels are UV resistant to avoid deterioration of the said materials. Especially, the adhesive between the spacer and glass panels can be a silicone based material.

The at least one glass panel of the glazing unit has a S11 surface and a S12 surface. S11 surface is facing the outside of the building and S12 surface is facing the inside of the building.

In some embodiments, the at least one glass panel are at least transparent for visible waves, meaning with a light transmission of at least 0.1, in order to see-through and to let light passing through.

In some embodiments, the at least one glass panel comprise at least two glass sheets separated by a spacer or laminated together.

The at least one glass panel can be manufactured by a known manufacturing method such as a float method, a fusion method, a redraw method, a press molding method, or a pulling method. As a manufacturing method of the glass panel 1, from the viewpoint of productivity and cost, it is preferable to use the float method.

The at least one glass panel can be flat or curved according to requirements by known methods such as hot or cold bending.

The at least one glass panel can be processed, i.e. annealed, thermally tempered, chemically tempered . . . to respect with the specifications of security and anti-thief requirements. Especially, the first glass panel can be thermally or chemically tempered to avoid breakage in case of overheat near the housing.

The at least one glass panel can be a clear glass or a coloured glass, tinted with a specific composition of the glass or by applying an additional coating or a plastic layer for example.

Figure 5:
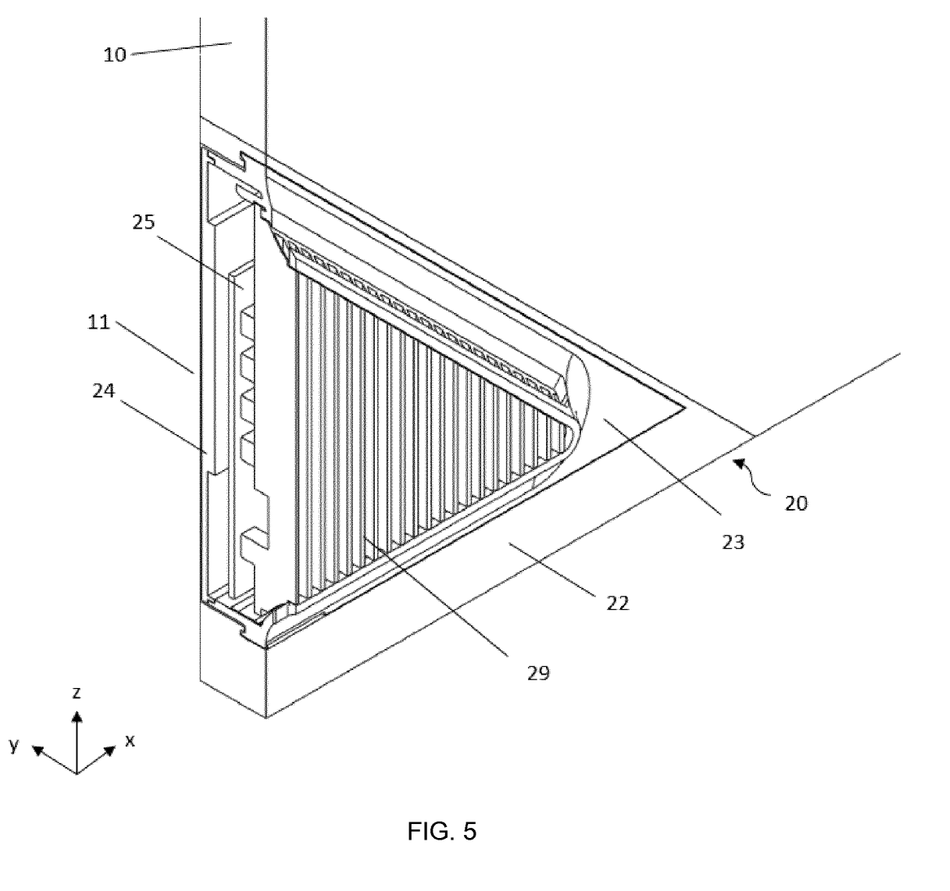

According to the invention with reference to FIG. 5, at least one coating system having at least a decoated zone in front of the antenna aperture of the communication unit can be disposed on at least one surface of the glazing unit. In some embodiments, the said at least one coating system can have several decoated zone depending of the application.

In some embodiments, the at least one glass panel can be processed and/or coloured, . . . in order to improve the aesthetic, thermal insulation performances, safety, . . . Each glass panel of the glazing unit can be independently processed and/or coloured as described.

The thickness, measured in Y-axis, of the at least one glass panel is set according to requirements of applications.

The at least one glass panel can be formed in a rectangular shape in a plan view by using a known cutting method. As a method of cutting the at least one glass panels, for example, a method in which laser light is irradiated on the surface of the at least one glass panel to cut the irradiated region of the laser light on the surface of the at least one glass panel to cut the glass panels, or a method in which a cutter wheel is mechanically cutting can be used. The glass panels can have any shape in order to fit with the application, for example a windshield, a sidelite, a sunroof of an automotive, a lateral glazing of a train, a window of a building, . . .

Some plastics elements can be fixed on the glazing unit to ensure the tightness to gas and/or liquid, to ensure the fixation of the glazing panel or to add external element to the glazing panel.

High in transmittance for RF signal, that also be a low in reflectance for RF radiation, means that RF radiation are mostly transmitted through the material whereas low in transmittance for RF signal, can also be a high in reflectance for RF radiation means that RF radiation are mostly reflected on the surface of the material and/or absorbed by the material and the attenuation is at level of 20 decibels (dB) or more. High in transmittance, can mean low in reflectance, means an attenuation at level of 10 decibels (dB) or less. The coating system which is low in transmittance, can mean high in reflectance, for RF radiation means that the coating system is non-transmitting to RF radiation.

In some preferred embodiments, a coating system which is high in reflectance for RF radiation disposed on at least said S21 surface of the second glass panel and/or said S12 surface of the first glass panel with at least a decoated zone in front of the said housing.

According to the invention, the coating system can be a functional coating in order to heat the surface of the glazing panel, to reduce the accumulation of heat in the interior of a building or vehicle or to keep the heat inside during cold periods for example. Although coating system are thin and mainly transparent to eyes.

The coating system can be made of layers of different materials and at least one of this layer is electrically conductive. The coating system is electrically conductive over the majority of one major surface of the glazing panel.

The coating system of the present invention has an emissivity of not more than 0.4, preferably less than 0.2, in particular less than 0.1, less than 0.05 or even less than 0.04. The coating system of the present invention may comprise a metal based low emissive coating system; these coatings typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. Concerning the dielectric layers, they are transparent and traditionally each dielectric layer is made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

For example, the coating system is applied to the glazing unit 1 to transform it to a low-E glazing unit. This metal-based coating system such as low-E or heatable coating systems.

In some embodiment, the coating system 20 can be a heatable coating applied on the glazing unit to add a defrosting and/or a demisting function for example.

As the coating system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

Preferably, the coating system is placed on the majority of one surface of the glazing unit and more preferably on the whole used surface of the glass pane.

In some embodiments, a masking element, such as an enamel layer, can be add on a part of the periphery of the glazing unit.

A simple approach to this problem of RF energy reflection is to remove a portion of the coating system to avoid to have a high reflectance for RF radiation. This approach, however, reduces the solar control benefits offered by the glazing unit and for equipment located inside the building, the vehicle or the car, the region would be unacceptably large. On top of that, the transition between the decoated zone and the coating itself is eye-visible and usually non-accepted by users.

Another solution has been to cut lines in the coating system to create a surface which is frequency selective, that is, it has relatively high reflectivity/absorbance for solar energy but relatively high in transmittance in the RF region of the electromagnetic spectrum. The cutting may be performed by laser ablation and the spacing of the slits is chosen to provide selectivity at the desired frequency.

The decoated zone can be a zone without coating and because this zone is small compared to the size of the first inner glass pane thermal performances are not impacted. The decoated zone can be a frequency selective surface.

According to the invention, the frequency selective decoated zone of the coating system may be a series or patterns of intersecting ablated paths may be created in the coating system, while leaving behind the coating system in untouched areas and only a very small percentage of the area of the coating system is removed from the glazing panel, and most of the coated glass remains untouched to keep performances of the coating system.

These paths are produced in such a way as to create areas of the coating system allowing the glazing panel to retain most of its energy conserving properties or heatable properties, while the ablated paths allow passage of RF signals through the glazing panel.

In various embodiments, paths can be made by pulse laser to create spots. The diameter of the spot is about 20-25 um, so that each path will be approximately this width. In alternative embodiments, different sized spots (e.g., 10-200 microns in diameter) and paths may be used. Moreover, the spots overlap and the amount of overlap may be approximately 50% by area; the extent of overlap may vary in alternative embodiments. In some embodiments, the overlap may range from 25% to over 90% for example. The pattern of ablated intersecting paths may be varied.

In some embodiments, the decoated area of a coated system may be 40% or less of the total coated area depending of the application, the material used in the glazing unit, . . . In other embodiments, a different percentage may be used (e.g. 5% or less total area of the coating system removed, and 95% total area of a coating system retaining untouched). In other embodiments, the coated system is decoated on at least one portion of his surface, this decoated zone represents less than 2% of the coating in this zone. In others embodiments, several decoated zone can be present and the decoated surface is at most 3% of the total coated area.

The decoated zone can be made on other parts of the surface of the glass pane, then another percentage can be done. Some designs can also change is percentage.

Note that while ablation of a higher percentage of the area may improve the transmission of RF signals through the glazing unit, ablation of more of the coating system diminishes the energy conserving properties heatable performances of the glazing unit.

The glazing unit can be placed on a façade of a building as a window. The glazing unit according to the invention can also be placed as a window of a vehicle.

The user inside a building or a vehicle can receive the signal from a far (at least one meter) fixed station or active or passive repeater directly through the glazing without the need of an external element such as an exterior repeater, retrieving the signal from the provider fixed station or active or passive repeater to communicate in fine with the communication device of the glazing unit according to the invention.

The module can be also used for an outdoor repeater (either in the same or different technology) and/or a serving cell to boost the network coverage outdoors.

The glazing unit can be a fixed access point for CPE, users meaning that indoor and/or outdoor from the building users can receive signal directly from the glazing unit without the need of an external element such as an exterior repeater, retrieving the signal from the communication device of the glazing unit according to the invention. The user can receive the signal directly from the glazing unit according to the invention.

Figure 6:
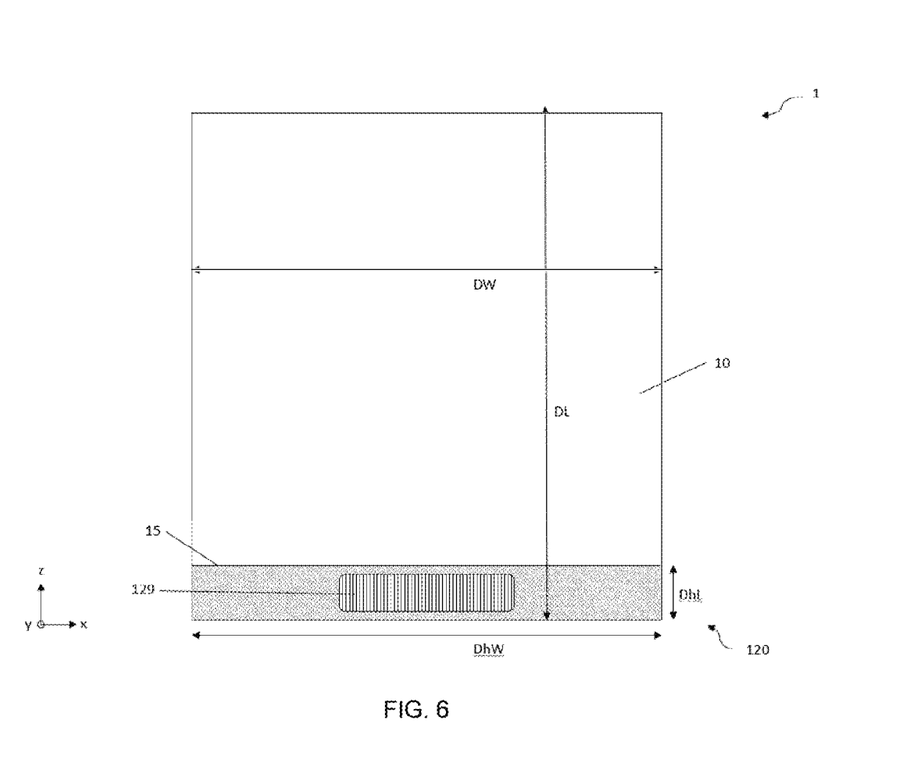
FIG. 6 is schematic views of a second embodiment of glazing unit according to the invention.

In some embodiments, as shown in FIG. 6, the glazing panel comprises a first glass panel and a second glass panel separated by a spacer 13. In the area of the opening of the second inner glass panel, the spacer may follow the shape of the opening in order to correctly insure the adhesion of the first and the second glass panel to the spacer. In case of VIG, the sealing material able to keep the vacuum may follow the shape of the opening in order to correctly insure the tightness and the vacuum.

In this embodiment, the means is a spacer 13 and the spacer separates the first outer glass panel from the second inner glass panel to create a space filled by a gas like Argon to improve the thermal isolation of the glazing unit, creating an insulating glazing unit. In the area of the opening 15 of the second inner glass pane 12, the spacer 13 may follow the shape of the cutout in order to correctly insure the adhesion of the first and the second glass sheet to the spacer. The spacer is then placed in the border of the second glass panel allowing the tightness of the volume 14 of the glazing unit to keep the gas in this volume 14.

The invention also refers to a communication system comprising at least a glazing unit according to the invention and a provider fixed station or active or passive repeater, which is placed at least at 1 m outside from the glazing unit.

The invention also refers to a communication system comprising at least a glazing unit according to the invention to provide indoor and/or outdoor coverage as a fixed access point.

The invention claimed is:

1. A glazing unit extending along a plane, P, defined by a longitudinal axis, X, and a vertical axis, Z; having a width, DW, measured along the longitudinal axis, X, and a length, DL, measured along the vertical axis, Z, comprising:
   a glass panel,
   a housing able to accommodate a communication device, and
   an opening arranged on the glass panel,
   wherein the opening has substantially the same dimensions in plane P as the housing and in that the housing is placed in the opening, and
   wherein the housing comprises a heatsink.

2. The glazing unit according to claim 1, wherein the glazing unit comprises a 4G and/or 5G signal communication device having at least one antenna.

3. The glazing unit according to claim 1, wherein the housing comprises side parts and a cover.

4. The glazing unit according to claim 3, wherein the housing comprises a bottom surrounded by side parts.

5. The glazing unit according to claim 1, wherein the housing has at least one attaching means for attaching the cover to the side parts.

6. The glazing unit according to claim 1, wherein a coating system which is low in transmittance for RF signal is disposed on at least one major surface of the glazing panel.

7. The glazing unit according to claim 1, wherein the opening is arranged in an area of a corner of the glass panel.

8. The glazing unit according to claim 7, wherein the opening is a cut-out and a shape of the cut-out is a triangle or an arc or a polygon.

9. The glazing unit according to claim 1, wherein an opening is arranged in a side of the glass panel.

10. The glazing unit according to claim 9, wherein the opening is a cut-out and a shape of the cut-out is a rectangle or an arc or a polygon.

11. The glazing unit according to claim 1, wherein the opening is surrounded by the glass panel.

12. A communication system comprising:
   a glazing unit according to claim 1 and
   a provider fixed station or active or passive repeater, which is placed at least at 1 m outside from the glazing unit.

13. A communication system comprising at least a glazing unit according to claim 1 configured to provide indoor and/or outdoor coverage as a fixed access point.

14. The glazing unit according to claim 1, wherein an opening is arranged in a lower part of the glass panel.

15. The glazing unit according to claim 9, wherein the opening is a cut-out and a shape of the cut-out is a rectangle and one side of the rectangle has substantially a same size as a side of the glass panel.

16. The glazing unit according to claim 3, wherein the heatsink is placed on the cover facing an outside of the housing.

17. The glazing unit according to claim 7, wherein the opening is arranged in a lower part of the glass panel.

* * * * *